Oct. 29, 1968   M. VENANZETTI   3,407,670
VIBRATING ECCENTRIC MASS DEVICE COMPRISING ONE OR MORE
PAIRS OF VIBRATORS INDEPENDENTLY ROTATING
IN OPPOSITE DIRECTION TO ONE ANOTHER
Filed March 21, 1966

INVENTOR
MICHELE VENANZETTI

BY Burns, Doane, Benedict, Swecker & Mathis

ATTORNEY

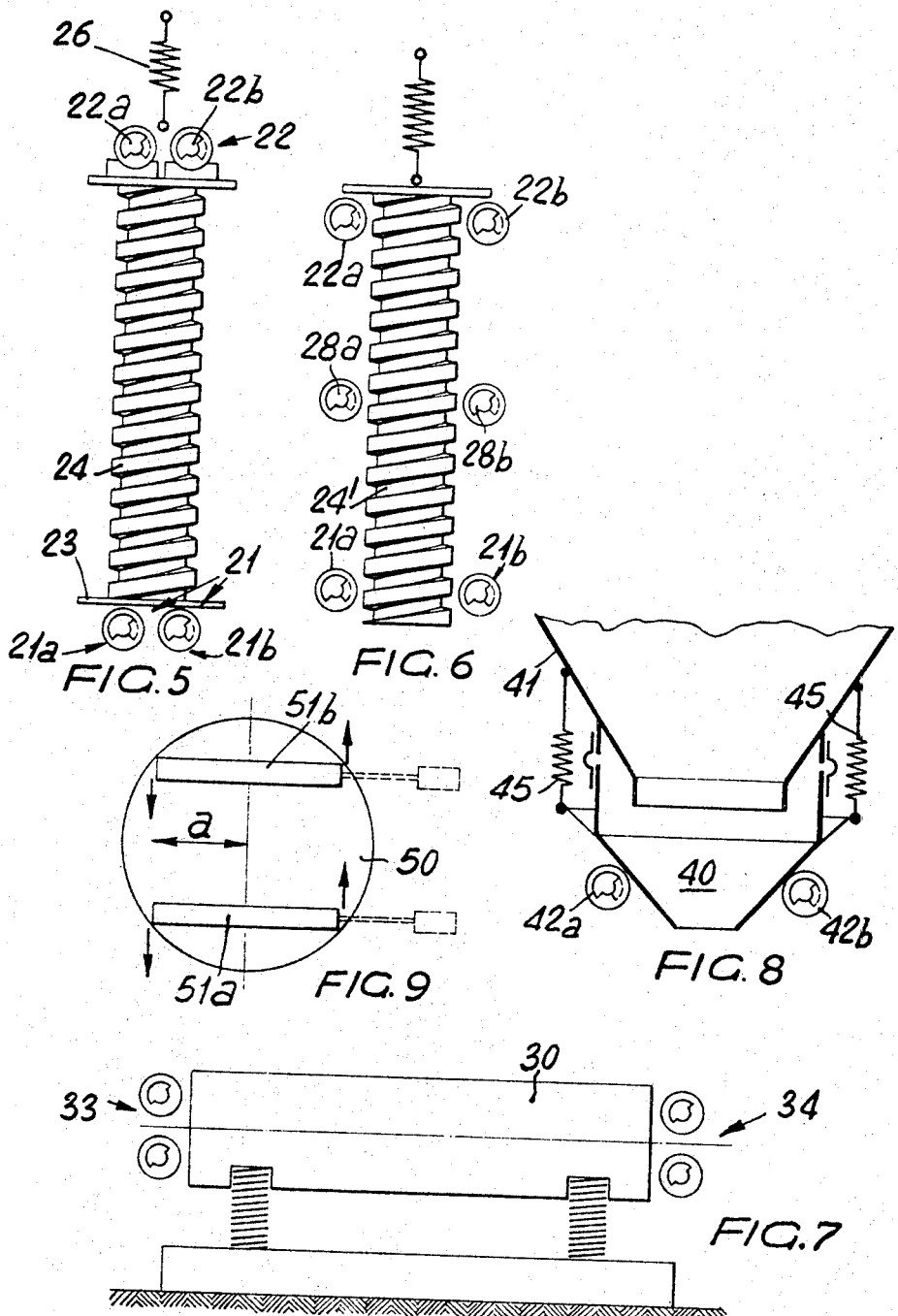

United States Patent Office 3,407,670
Patented Oct. 29, 1968

3,407,670
VIBRATING ECCENTRIC MASS DEVICE COMPRISING ONE OR MORE PAIRS OF VIBRATORS INDEPENDENTLY ROTATING IN OPPOSITE DIRECTION TO ONE ANOTHER
Michele Venanzetti, Piazza Repubblica 25, Milan, Italy
Filed Mar. 21, 1966, Ser. No. 541,904
Claims priority, application Italy, Mar. 22, 1965, 2,611/65; Mar. 7, 1966, 15,260/66
4 Claims. (Cl. 74—61)

The present invention relates to a vibrating eccentric mass device comprising one or more pairs of vibrators independently rotating in opposite direction to one another; such a device is suitable for transmitting a combined rotatary and shaking alternative motion.

More particularly, the subject of the present invention is a vibrating device of the above type characterized by comprising: on one or more planes parallel to one another one or more pairs of rotating vibrators, which are independent in each pair, rotating in self-synchronism in opposite direction to one another, said vibrators being arranged with parallel shafts, so that the plane passing through the same is normal to the axis of the rotary and shaking alternative motion, the supporting and/or suspension system of the machine to which the assembly is applied being such as to allow freedom of movement thereto.

The accompanying drawings schematically show by way of not restrictive example some embodiments of the device subject of the present invention, and particularly:

FIGURE 5 shows a second embodiment of the subject device also applied to a spiral elevator;

FIGURE 6 shows a third embodiment of such a device, always applied to a spiral elevator;

FIGURE 7 shows another embodiment of the device subject of the present invention, where in the motion axis is horizontal;

FIGURE 8 shows still another embodiment of the device subject of the present invention applied to the vibrating end of a hopper; and FIGURE 9 shows still another embodiment.

Figure 1:
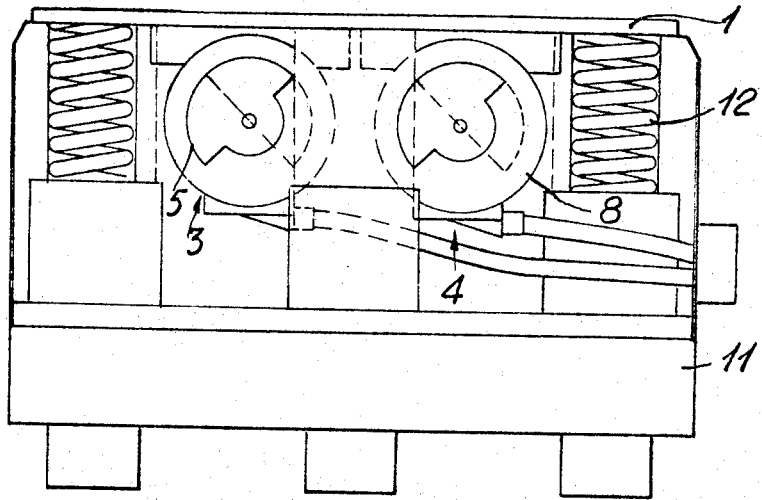
FIGURE 1 is a sectional view of a first embodiment of the device according to the invention.
Figure 2:
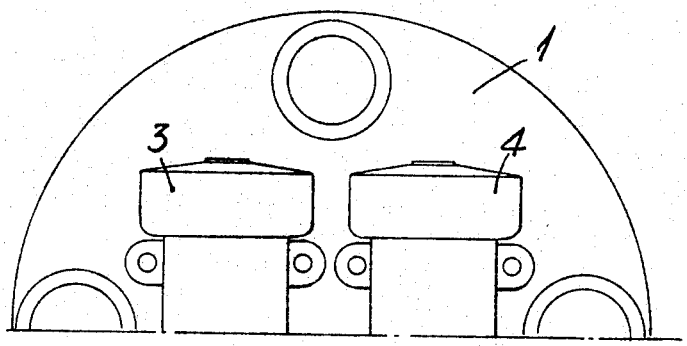
FIGURE 2 is a partial bottom plan view of the device of FIGURE 1.
Figure 3:
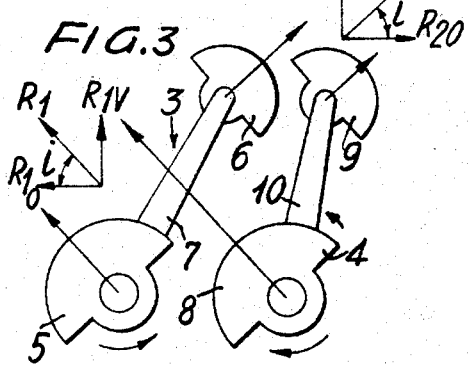
FIGURE 3 is a diagrammatic perspective view of the arrangement of the eccentric masses on the vibrator shafts of the device of FIGURES 1 and 2.

Referring to FIGURES 1, 2 and 3, it will be seen that the device subject to the present invention comprises two rotating eccentric mass vibrators, respectively indicated at 3 and 4, and fixed below a common plate 1.

Plate 1 is suspended on a bed II through a plurality of springs 12, or similar elements suitable to ensure freedom of the combined rotary and shaking alternative movement.

Each of the vibrators 3 and 4 carry an eccentric mass keyed to each end of the rotating shaft thereof: in the figure, there are indicated at 5 and 6 those at the end of shaft 7 of vibrator 3 and at 8 and 9 those at the end of shaft 10 of vibrator 4.

The two vibrators 3 and 4 are caused to rotate in opposite direction to each other, for example, vibrator 3 in counterclockwise direction and vibrator 4 in clockwise direction; the two vibrators 3 and 4 are disposed having shafts 7 and 10 parallel and so that the plane passing through shafts 7 and 10 thereof is horizontal and parallel to plane I, to which the vibrators are fixed, and normal to the axis of the rotary and shaking alternative motion.

Vibrators 3 and 4 rotate in synchronism in opposite direction so that resultants R1 and R2 at the opposite ends of the shafts have the vertical components $R1_v$ and $R2_v$ (generators of the shaking motion) parallel and directed in the same direction, whereas the horizontal components $R1_o$ and $R2_o$ are parallel but of opposite direction, so as to create the generating pair of the rotary alternative motion. Synchronism is accomplished without any restraint element between the two vibrators, by taking the advantage of known physical principles of synchronization of the mechanical pulses being transmitted along with the oscillations of the vibrating element receiving the same.

The eccentric masses 5 and 6 and 8 and 9, respectively, are keyed onto the shafts 7 and 10, respectively, so as to define in the shaft plane an alternate acting torque, the arm of which is formed of the distance between the two eccentric masses of each vibrator, and, in a plane perpendicular to the former, an alternate shaking resultant in both directions. The keying of the masses may also be carried out in such a manner that the resultants R1 and R2 of FIGURE 3 form with the respective horizontal components like angles $i$ having such a predeterminable value from 0° to 90° that at the two mentioned limits it is possible to have, respectively, an exclusively rotary motion and an exclusively shaking motion. Said angle $i$ is usually called incidence angle, that is the angle allowing to vary the ratio between the vertical and horizontal components; thus, an increase of value for the shaking motion compared with the rotary motion or vice versa is achieved.

The variation of the incidence angle is obtained in any of the known ways; preferably, each eccentric mass will be constructed as two semi-masses, so that said variation will be obtained by offsetting one semi-mass relative to the other.

By the foregoing, a first embodiment of the device subject of the present invention has been particularly described.

Figure 4:
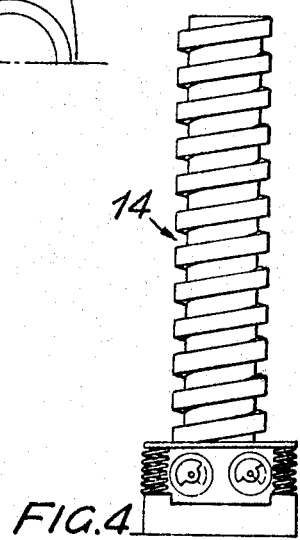
FIGURE 4 shows the device of FIGURES 1 and 2 applied to a spiral elevator.

FIGURE 4 shows, for example, a spiral elevator 14 to which the above described device transmits the combined rotary and shaking alternative motion.

Other embodiments will now be described, in which, instead of a single pair of vibrators, there will be two or more pairs: for each pair and for the relationship among the pairs all that has been above disclosed with reference to the pair of vibrators 3 and 4 will be true.

On considering at first FIGURE 5, it will be seen that the assembly subject of the present invention comprises in a second embodiment thereof two independent pairs of vibrators indicated, as a whole, at 21 and 22, respectively.

Vibrators of pair 21, respectively indicated at 21a and 21b, are fixed below a common plate 23 carrying the spiral elevator 24, to which the device transmits the combined rotary and shaking alternative motion.

The supporting and/or suspension system may be of any known type; in particular, there is shown in the figure a suspension type by means of spring 26.

The pair of vibrators 22, formed of vibrators 22a and 22b, is arranged at the top of the spiral elevator 24.

For both the pairs of vibrators 21 and 22, what stated above about the pair of vibrators 3 and 4 is valid.

Thus, after all the device formed of the pair of vibrators 21 and of the pair of vibrators 22 defines on the spiral elevator 24 a combined rotary and shaking alternative motion, wherein stresses on the spiral elevator are the half of the stresses resulting from the solution of figure 4.

FIGURE 6 shows another embodiment of the device subject of the present invention, on the ground of which a plurality of pairs of vibrators (for example 21, 22, 28)

are arranged on different parallel planes, along two or more opposite generatrixes of the spiral elevator 24'.

The considerations disclosed for the device of FIGURE 1 are valid for this device, when remarking that stresses are better distributed and of a reduced specific value.

FIGURE 7 shows a fourth embodiment of the device subject of the present invention, wherein the plane passing through the shafts of the present invention, wherein the plane passing through the shafts of the two vibrators of each pair is vertical. More particularly, the machine 30, to be subjected to the combined rotary and shaking alternative motions, suspended or supported according to any of the known methods, carries the pairs of vibrators 33 and 34 thereto connected at the ends thereof. The above statement relating to the pairs of vibrators 21 and 22 of FIGURE 1 and to those of the subsequent figures is valid for said pairs of vibrators.

It is only to be noted, as above stated, that the plane passing through the shafts of the vibrators of each pair 33 and 34 is vertical, whilst the axis of the motion being generated is horizontal.

FIGURE 8 shows still another embodiment of the device subject of the present invention.

Said device is applied to the vibrating end 40 of a hopper 41 and is comprised of a pair of vibrators 42a and 42b directly connected to element 40. The two vibrators 42a and 42b are arranged with parallel shafts and the plane passing through said shaft is normal to the axis of the alternative motion generated by the element 40. In this case, the element subjected to such alternative motion, that is element 40, is suspended through a plurality of springs 45.

When it is desired to increase the value of the pair generating the rotary motion by increasing the arm $a$ thereof and not by increasing the intensity of forces developed by the eccentric masses, as seen from FIGURE 9, the assembly can be formed of the cited plurality of pairs of vibrators (two in the figure, fixed to a plate 50 of the machine to which the motion is to be transmitted) being comprised of, for example, two vibrators 51a, 51b of a suitably extended type.

Vibrators may be of the motor incorporated type, or of the separate motor type, as shaded in the figure.

Preferably, the vibrators forming part of the device subject of the present invention, are electric.

However, it is provided that they may be hydraulic, or pneumatic vibrators, or vibrators of other type.

It is to be noted that each vibrator has in each pair the eccentric masses already prearranged at the shaft ends with suitable phase-displacement so as to realize a torque.

It is also to be noted that each vibrator of a pair being considered is suitable to create the torque generating the alternative rotary motion, whereas the shaking motion is obtained in known way by the combination of the two vibrators rotating in opposite direction. Obviously, the value for the torque of each vibrator is a half of that realized by the two vibrators.

Moreover, it is to be noted that being the powers required for starting the eccentric mass machines normally twice than the rating one, the device provides for a starting by utilization of both motors of each pair and the rate working by utilization of only one motor, the other vibrator being driven rotated in synchronism.

To this purpose, the device includes a suitable switch. As a matter of fact, the power of the operating motor will be sufficient for the rating operation.

As above stated, the cited examples of embodiments and applications of the device subject of the present invention are only some of the many examples of embodiments and applications that can be carried out according to the present invention.

Modifications and variations can be made in the device according to the invention without departing for this from the protective field of the present invention; for example, not only can the axis of the rotary and shaking motion be horizontal or vertical, but it may also have any gradient or inclination.

What is claimed is:
1. A vibrating device comprising,
a base member,
first and second parallel, axially extending shafts having the axes thereof lying in a first plane,
mounting means connected with said base member and said shafts supporting said shafts for axial rotation,
means connected with said base member and said shafts for concurrently rotating said shafts in opposite directions,
support means connected with said base member supporting said base member for limited motion in directions parallel to and perpendicular to said first plane,
a first pair of generally equal masses disposed in a second plane perpendicular to said first plane and intersecting said shafts at right angles,
first securing means for fixedly securing one of said masses in said first pair to said first shaft and for securing the other of said masses in said first pair to said second shaft,
each of said masses of said first pair having a center of gravity eccentrically displaced from the axis of rotation of the associated one of said shafts to cause each of said masses during rotation thereof to exert a dynamic force upon the associated one of said shafts with the dynamic force having instantaneous force components parallel to and perpendicular to said first plane, said first securing means securing said masses in said first pair to the respective said shafts in such angular relation to each other as to cause the respective force components parallel to said first plane exerted by said masses of said first pair to be equal and opposite and to cause the respective force components perpendicular to said first plane exerted by said masses of said first pair to be equal and additive;
a second pair of generally equal masses disposed in a third plane, said third plane being parallel to and spaced from said second plane,
second securing means for fixedly securing one of said masses in said second pair to said first shaft and for securing the other of said masses in said second pair to said second shaft,
each of said masses of said second pair having a center of gravity eccentrically displaced from the axis of rotation of the associated one of said shafts to cause each of said masses during rotation thereof to exert a dynamic force upon the associated one of said shafts with the dynamic force having instantaneous force components parallel to and perpendicular to said first plane, said second securing means securing said masses in said second pair to the respective said shafts in such angular relation to each other as to cause the respective force components parallel to said first plane exerted by said masses of said second pair to be equal and opposite and to cause the respective force components perpendicular to said first plane to be equal and additive;
said masses in said first pair being oppositely angularly related to said masses in said second pair to cause said additive force components exerted by said first pair of masses to be directed in an opposite direction to said additive force components exerted by said second pair of masses;
whereby an alternating couple acting about an axis intermediate and parallel to said second and third planes and lying in said first plane is applied to said base member to impart thereto a vibratory rectilinear shaking motion perpendicular to said first plane.

2. A vibrating device as defined in claim 1 wherein, said first securing means further permits selective variation of the positions of fixed angular location of each of said masses in said first pair on said shafts to permit said masses to be progressively angularly moved to a position in which said masses in said first pair are angularly positioned in such relation to each other as to cause the respective force components perpendicular to said first plane to be equal and opposite and to cause the respective force components parallel to said first plane to be equal and additive in one direction parallel to said first plane.

said second securing means further permitting selective variation of the fixed location of each of said masses in said second pair on said shafts to permit progressive angular movement of said masses of said second pair to a position in which said second masses in said second pair are angularly positioned in such relation to each other as to cause the respective force components perpendicular to said first plane to be equal and opposite and the respective force components parallel to said first plane to be equal and additive in another direction parallel to said first plane opposite to said one direction therein, whereby an alternating couple acting about an axis parallel to and intermediate said second and third planes and perpendicular to said first plane is applied to said base member to cause rotary vibratory motion thereof.

3. A vibrating device comprising, a base member, first and second parallel, axially extending shafts having the axes thereof lying in a first plane, mounting means connected with said base member and with said shafts for supporting said shafts for axial rotation, means connected with said shafts for rotating said shafts concurrently in opposite directions, support means connected with said base member supporting said base member for limited motion in directions parallel to and perpendicular to said first plane, a first pair of masses disposed in a second plane perpendicular to said first plane and intersecting said shafts at right angles, first securing means for fixedly securing one of said masses in said first pair to said first shaft for securing the other of said masses to said second shaft, each of said masses of said first pair having a center of gravity thereof eccentrically displaced from the axis of rotation of the associated one of said shafts to cause each of said masses during rotation thereof to exert a dynamic force upon the associated one of said shafts, the dynamic force having instantaneous force components parallel to and perpendicular to said first plane, said first securing means securing said masses in said first pair to the respective said shafts in such angular relation to each other as to cause the respective force components perpendicular to said first plane to be equal and opposite and to cause the respective force components parallel to said first plane to be equal and additive;

a second pair of masses disposed in a third plane, said third plane being parallel to and spaced from said second plane, second securing means for fixedly securing one of said masses in said second pair to said first shaft and for securing the other of said masses in said second pair to said second shaft, each of said masses of said second pair having a center of gravity eccentrically displaced from the axis of rotation of the associated one of said shafts to cause each of said masses in said second pair during rotation to exert a dynamic force upon the associated one of said shafts with the dynamic force having instantaneous force components parallel to and perpendicular to said first plane, said second securing means securing said masses in said second pair to the respective said shafts, in such angular relation to each other as to cause the respective force components perpendicular to said first plane to be equal and opposite and the respective force components parallel to said first plane to be equal and additive, said masses in said first pair being oppositely angularly related to said masses in said second pair to cause said additive force components exerted by said first pair of masses to be directed in an opposite direction to said additive force components exerted by said second pair of masses, whereby an alternating couple acting about an axis parallel to and intermediate said second and third planes and perpendicular to said first plane is applied to said base member to cause rotary vibratory motion thereof parallel to said first plane.

4. A vibrating device comprising, a base member, first and second parallel, axially extending shafts having the axes thereof lying in a first plane, mounting means connected with said base member and with said shafts supporting said shafts for axial rotation, means connected with said shafts for rotating said shafts concurrently in opposite directions, support means connected with said base members supporting said base member for limited motion in directions parallel to and perpendicular to said first plane, a first pair of masses disposed in a second plane perpendicular to said first plane, said second plane intersecting said shafts at right angles, first securing means for fixedly securing one of said masses in said first pair to said first shaft and for securing the other of said masses in said first pair to said second shaft, each of said masses of said first pair having a center of gravity eccentrically displaced from the axis of rotation of the associated one of said shafts to cause each of said masses during rotation thereof to exert a dynamic force upon the associated one of said shafts with the dynamic force having instantaneous force components parallel to and perpendicular to said first plane, said first securing means securing said masses in said first pair in such angular relation to each other as to cause the respective force components parallel to said first plane to be of relatively varying magnitude during rotation and the respective force components perpendicular to said first plane to be of relatively varying magnitude during rotation, whereby a vibratory motion combining two separate modes of motion is imparted to said base member, one of said modes of motion being a rotary vibratory motion acting parallel to said first plane and the other of said modes of motion being a rectilinear shaking motion acting perpendicular to said first plane.

References Cited

UNITED STATES PATENTS

| | | | |
|---|---|---|---|
| 2,236,392 | 3/1941 | Barry et al. | 259—1 |
| 3,053,379 | 9/1962 | Röder et al. | 74—61 |
| 3,059,483 | 10/1962 | Clynch et al. | 74—61 |
| 3,209,525 | 10/1965 | Karlsson | 74—61 |
| 3,302,470 | 2/1967 | Raniszewski | 74—61 |

FRED C. MATTERN, Jr., *Primary Examiner.*

W. S. RATLIFF, *Assistant Examiner.*